(12) United States Patent
Szöke et al.

(10) Patent No.: US 7,127,312 B2
(45) Date of Patent: Oct. 24, 2006

(54) METHOD AND SYSTEM FOR ACQUIRING AND STORING DATA FROM A PRODUCTION PLANT

(75) Inventors: Szaniszlo Szöke, Gesves (BE); Gerhard Vollmar, Meckenheim (DE)

(73) Assignee: ABB Research LTD, Zuerich (CH)

( * ) Notice: Subject to any disclaimer, the term of this patent is extended or adjusted under 35 U.S.C. 154(b) by 495 days.

(21) Appl. No.: 10/262,145

(22) Filed: Oct. 1, 2002

(65) Prior Publication Data
US 2003/0060915 A1 Mar. 27, 2003

Related U.S. Application Data

(63) Continuation of application No. PCT/EP00/02929, filed on Apr. 1, 2000.

(51) Int. Cl.
*G06F 15/18* (2006.01)

(52) U.S. Cl. ............... 700/103; 700/104; 700/110; 714/25; 714/799; 714/819

(58) Field of Classification Search ............... 700/103, 700/104, 110; 714/25, 799, 819
See application file for complete search history.

(56) References Cited

U.S. PATENT DOCUMENTS

| | | | | |
|---|---|---|---|---|
| 5,369,570 A | * | 11/1994 | Parad | 705/8 |
| 5,701,400 A | * | 12/1997 | Amado | 706/45 |
| 6,421,571 B1 | * | 7/2002 | Spriggs et al. | 700/17 |
| 6,618,709 B1 | * | 9/2003 | Sneeringer | 705/412 |

FOREIGN PATENT DOCUMENTS

| | | |
|---|---|---|
| DE | 36 14 331 A1 | 10/1986 |
| GB | 2 313 457 A | 11/1997 |

\* cited by examiner

*Primary Examiner*—Leo Picard
*Assistant Examiner*—Michael D. Masinick
(74) *Attorney, Agent, or Firm*—Laurence A. Greenberg; Werner H. Stemer; Ralph E. Locher

(57) ABSTRACT

A method and a system acquire and store data from a production plant in order to provide relevant data for a fault analysis. Here, the production plant is allocated a data server, with the aid of which production data acquired by measurement are buffered. By a data input of a data processing device, additional information, which an operator inputs, can be acquired. By an event monitoring functional unit belonging to the data processing device, an evaluation of production data is carried out cyclically, the event monitoring system has access to production data in the data server, as well as to the additional information, on the basis of monitoring criteria which are contained in a stored script, and stores relevant production data in one of a number of databases depending on the event detected.

5 Claims, 4 Drawing Sheets

Product DB:

| Time | Duration | Product name |
|---|---|---|
| 25/01/2000 10:10:00 | 00:30:00 | "Days and Night dessert coffee 500 g" |
| 25/01/2000 10:40:00 | 02:15:00 | "Ultra light 1 kg" |
| 25/01/2000 12:55:00 | 01:20:00 | usw. |

Order DB:

| Time | Duration | Order name |
|---|---|---|
| 25/01/2000 10:10:00 | 00:30:00 | "2516438592465 1-52" |
| 25/01/2000 10:40:00 | 02:15:00 | "exc-2516 14822-rt5" |
| 25/01/2000 12:55:00 | 01:20:00 | usw. |

Shift DB:

| Time | Duration |
|---|---|
| 25/01/2000 08:00:00 | 08:00:00 |
| 25/01/2000 14:00:00 | 08:00:00 |
| 25/01/2000 22:00:00 | 08:00:00 |

Machine operator DB

| Time | Duration | Action | Operator ID |
|---|---|---|---|
| 25/01/2000 07:50:00 | 00:05:00 | logon | 25 |
| 25/01/2000 07:55:00 | 00:10:00 | logon | 14 |
| 25/01/2000 14:05:00 | 00:02:00 | usw. | |

Measured value DB

| Time | Measured value | Identifier |
|---|---|---|
| 25/01/2000 10:10:00 | 24 | KT08 |
| 25/01/2000 10:15:00 | 26 | KT08 |
| 25/01/2000 10:35:00 | 30 | KT08 |

Fault DB

| Time | Duration | Fault event |
|---|---|---|
| 25/01/2000 10:15:12 | 00:00:08 | Pump stopped |
| 25/01/2000 10:15:20 | 00:00:06 | Overheat main motor |
| 25/01/2000 10:15:26 | 00:01:14 | Cooling main motor |

Fig. 3

```
Paper making machine events ( )
{
// Script for monitoring fault events on a paper making machine // Event monitoring criteria if( PumpOn = 0 ) then {
        newState = 3 ;   // 3 Stoppage
    }
    else {
        if( WebOn = 0 ) then {
            newState = 2 ;   // 2 Fibre breakage
        }
        else {
            if( RollSpeed < 20 ) then {
                newState = 1 ;   // 1 Creep speed
            }
            else {
                newState = 0 ;   // 0 Undisrupted operation
            }
        }
    }

// Store the events in the fault database
    if( newState != oldState) then {
        NewClassId(Now, NewClassLl);
        oldState = newState ;
    }
}
```

Fig. 4

METHOD AND SYSTEM FOR ACQUIRING AND STORING DATA FROM A PRODUCTION PLANT

CROSS-REFERENCE TO RELATED APPLICATION

This application is a continuation of copending International Application No. PCT/EP00/02929, filed Apr. 1, 2000, which designated the U.S. and was not published in English.

BACKGROUND OF THE INVENTION

Field of the Invention

The invention relates to a method and a system for acquiring and storing data from a production plant in order to provide relevant data for a fault analysis.

In industrial operations it is increasingly common to connect the programmable logic control system of a production plant to a data processing device in order to acquire data for different evaluations or activities. For example, in order to find the causes for frequent machine stoppages, to determine production costs or to reduce losses.

For the purpose of acquiring data for fault analyses, the use of methods with signal recording is common, as are also methods for recording events from a signal processing system (results recording).

Signal recording is primarily used for system monitoring, a high number of signals being acquired in real-time. In this case, a high resolution over time is possible. However, the drawback is that fault situations can only be detected after complicated analysis. It is often necessary for a large quantity of data, acquired during a relatively long time period, to be analyzed, since a number of hours may have elapsed before, for example, a causative event of a machine stoppage.

Results recording is used in conjunction with specific fault analysis software. In this case, the signals are evaluated in real-time, and cumulative results data are stored, so to speak, in real-time. For example, data accumulated in this way from a predefined section of the operating period, in particular from a working shift, can be stored. Advantages of the method reside in the fact that in each case only small quantities of data are acquired and can be stored for a long time with little effort, and that analysis of the recordings can be carried out very quickly, since the complicated signal analysis has already been carried out. However, the drawback is that only integrated results from previously defined periods of time are available. For this reason, it is not subsequently possible for other time periods to be selected for an extensive analysis, for example a period during which a fault event occurred.

SUMMARY OF THE INVENTION

It is accordingly an object of the invention to provide a method and a system for acquiring and storing data from a production plant that overcomes the above-mentioned disadvantages of the prior art devices and methods of this general type, which provides improved acquisition and provision of production data.

With the foregoing and other objects in view there is provided, in accordance with the invention, a method for acquiring and storing data from a production plant to provide relevant data for a fault analysis. The method includes assigning the production plant a data server, the data server buffering production data acquired by measurement. Additional information, input by an operator, is acquired using a data input of a data processing device. An event monitoring functional unit of the data processing device is used for carrying out an evaluation of the production data cyclically. The event monitoring functional unit accesses the production data stored in the data server and the additional information on a basis of monitoring criteria. The monitoring criteria is contained in a stored script, and, depending on an event detected, the event monitoring functional unit directing a storing of relevant production data in one of a number of databases.

The invention essentially proposes to detect and to store, by use of a script language, only the signals which are needed for defined purposes, in particular for the graphic representation of production-relevant facts. Neither large quantities of data nor cumulative data are stored, and thus the drawbacks of known procedures are avoided.

With the foregoing and other objects in view there is provided, in accordance with the invention, a system for acquiring and storing data from a production plant to provide relevant data for a fault analysis. The system contains a data server coupled to the production plant, the data server buffering production data acquired by measurement. A data processing device is connected to the data server. The data processing device contains a data input for receiving additional information entered by an operator, procedure-dependent databases, and an event monitoring functional unit connected to the data input for receiving the additional information, to the data server for calling up the production data, and to the procedure-dependent databases. The event monitoring functional unit links the production data to the additional information. The event monitoring functional unit determines whether one of a number of predefined events has occurred, and if one of the predefined events has occurred the event monitoring functional unit performs relevant data recording. The relevant data is stored in one of the procedure-dependent databases, depending on a type of the predefined event.

In accordance with an added feature of the invention, the data processing device has a script memory for storing at least one script relating to event monitoring. The script memory is connected to the event monitoring functional unit.

In accordance with another feature of the invention, the procedure-dependent databases are formed of six individual databases. The six individual databases include a specific product database, a specific job database, a working shift database, an operator logging on and logging off database, a data acquisition for an intended display database, and a production loss and other events database.

In accordance with a concomitant feature of the invention, the data processing device is set up to compile graphic displays of production-relevant facts, with access to the relevant data stored in the procedure-dependent databases.

Other features which are considered as characteristic for the invention are set forth in the appended claims.

Although the invention is illustrated and described herein as embodied in a method and a system for acquiring and storing data from a production plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows a database structure; and

FIG. 4 is a table showing an event script.

DESCRIPTION OF THE PREFERRED EMBODIMENTS

Figure 1:
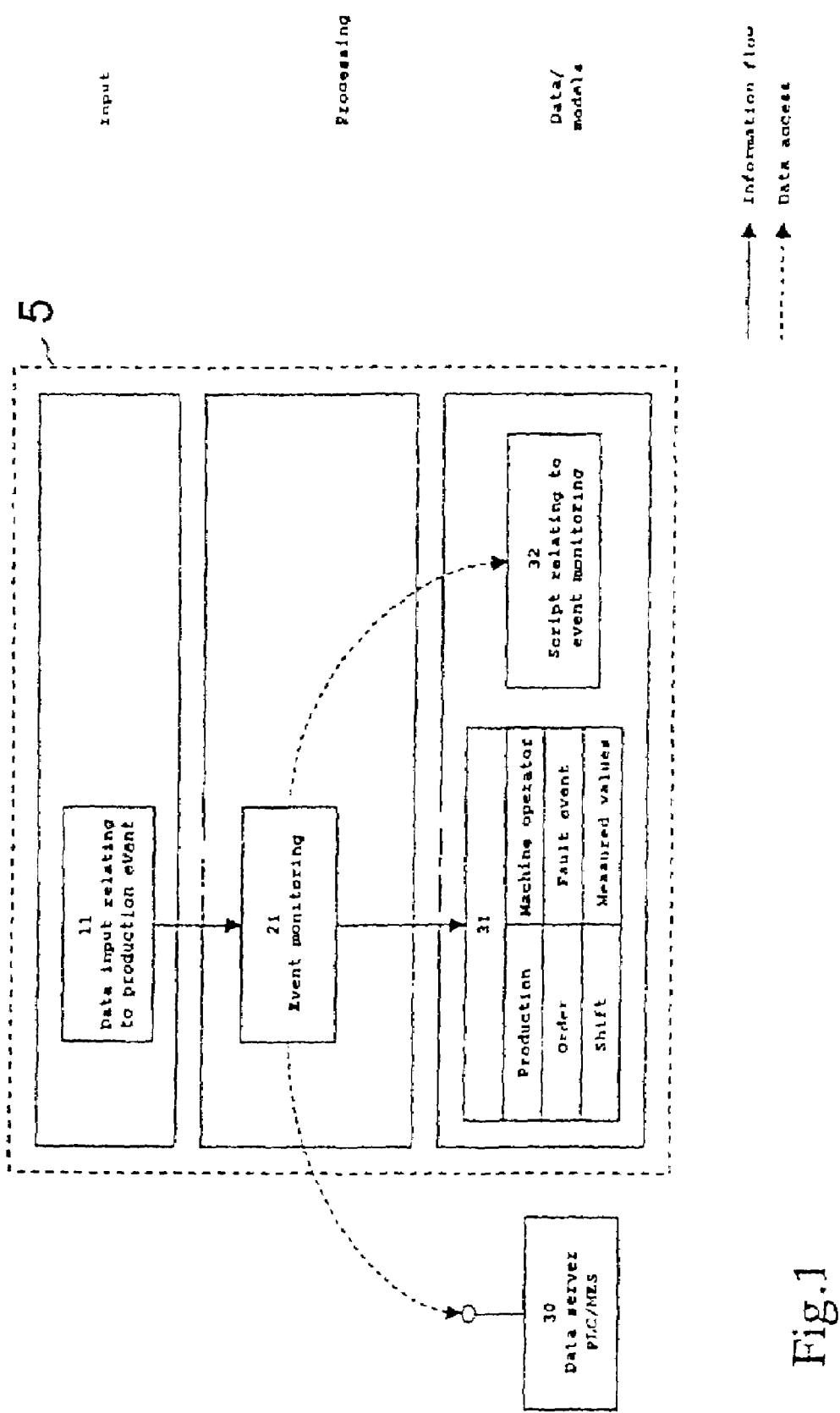
FIG. 1 is a block diagram showing a configuration for acquiring and providing data according to the invention.

Referring now to the figures of the drawing in detail and first, particularly, to FIG. 1 thereof, there is shown functional units of a system. Signals acquired in a production plant are buffered in a data server 30 belonging to a programmable logic control system (PLC/MES). A data processing device 5 has a data input 11. Data relating to production events can be input by an operator as additional information. The data input 11 is connected to an event monitoring system 21, which also has access to the signals stored in the data server 30. The event monitoring system 21 additionally has access to a script memory 32, in which one or more scripts for monitoring events are stored. The event monitoring system 21 is set up to carry out an evaluation of signals in accordance with monitoring criteria cyclically, for example after each 5 seconds, the criteria being contained in the respective script and—depending on the fault event detected—to store data in different data bases 31.

Figure 2:
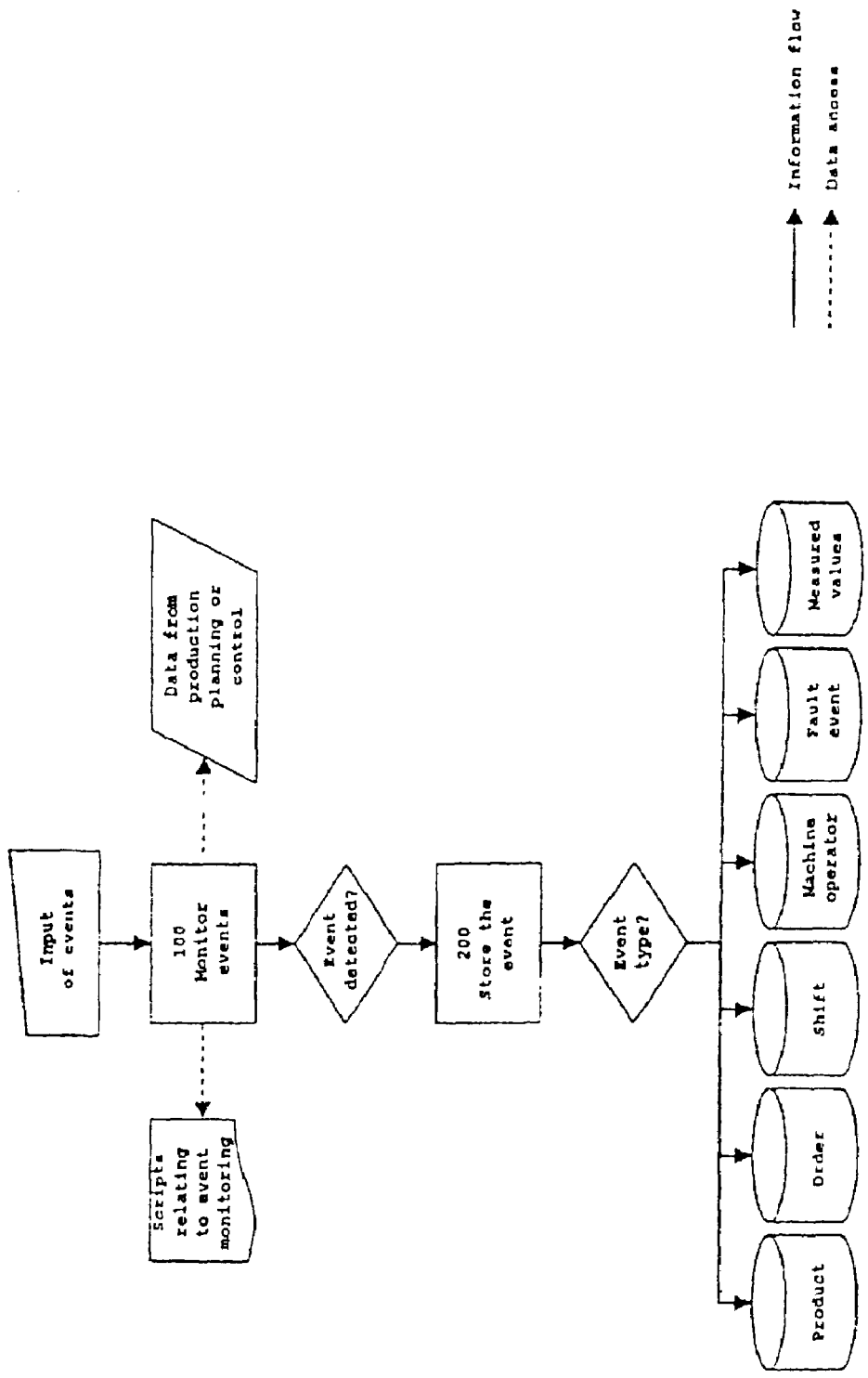
FIG. 2 is a flow chart showing sequence steps for a method according to the invention.

FIG. 2 shows steps according to the method for the acquisition and storage of data from the production plant. In step 100, the production data that the data server 30 provides or which are input through the data input 11 are evaluated. The evaluation is performed cyclically by the event monitoring system 21. The monitoring criteria needed for this are taken from the script for event monitoring. Such a script is shown in FIG. 4 by way of example as a script for monitoring fault events in a papermaking machine.

If an event is detected, in step 200 the data are stored in different databases 31, depending on the event type. The instructions relating to which data have to be stored in which database are taken from the script for the event monitoring.

FIG. 3 shows, by way of example, the structure of the databases 31 for product, order, shift, machine operator, measured values and fault events. In the product database, the start of production of a product, the production duration and product name are stored. In the order database, the start of the order, duration and order designation are stored. In the shift database, the start of the shift and duration of the shift are stored. In the machine operator database, the start of the operator action, duration and designation of the action, as well as an operator identification number are stored. In the measured value database, analog measured signals are stored with a time stamp, identification and measured value. In the fault database, for a fault event the designation of the event, the start of the occurrence and the duration of the fault event are stored.

FIG. 4 shows, by way of example, the event script for the detection of papermaking machine faults. Specific language constructs are available for the compilation of a script. Essential language speech constructs for event monitoring are access functions to analog and binary signals from the control system, state comparisons between variables, and storage instructions for the specific deposition of information in the different databases.

We claim:

1. A method for acquiring and storing data from a production plant to provide relevant data for a fault analysis, which comprises:

assigning the production plant a data server, the data server buffering production data acquired by measurement;

acquiring additional information, input by an operator using a data input of a data processing device; and using an event monitoring functional unit of the data processing device for carrying out an evaluation of the production data cyclically, the event monitoring functional unit accessing the production data stored in the data server and the additional information on a basis of monitoring criteria, the monitoring criteria being contained in a stored script, and, depending on an event detected, the event monitoring functional unit directing a storing of relevant production data in one of a number of procedure-dependent databases, the relevant production data being stored in a procedure-dependent database depending on a type of the predefined event; and for a detected fault event, storing in a fault event database the designation of the event, the start of the occurrence and the duration of the fault event.

2. A system for acquiring and storing data from a production plant to provide relevant data for a fault analysis, the system comprising:

a data server coupled to the production plant, said data server buffering production data acquired by measurement; and a data processing device connected to said data server, said data processing device containing:

a data input for receiving additional information entered by an operator;

procedure-dependent databases; and an event monitoring functional unit connected to said data input for receiving the additional information, to said data server for calling up the production data, and to said procedure-dependent databases, said event monitoring functional unit linking the production data to the additional information, said event monitoring functional unit determining whether one of a number of predefined events has occurred, and if one of the predefined events has occurred said event monitoring functional unit performing relevant data recording, the relevant data being stored in one of said procedure-dependent databases, depending on a type of the predefined event, and for a detected fault event, storing in a fault event database the designation of the event, the start of the occurrence and the duration of the fault event.

3. The system according to claim 2, wherein said data processing device has a script memory for storing at least one script relating to event monitoring, said script memory connected to said event monitoring functional unit.

4. The system according to claim 2, wherein said procedure-dependent databases are formed of six individual databases, said six individual databases include a specific product database, a specific job database, a working shift database, an operator logging on and logging off database, a data acquisition for an intended display database, and a production loss and other events database.

5. The system according to claim 2, wherein said data processing device is set up to compile graphic displays of production-relevant facts, with access to the relevant data stored in said procedure-dependent databases.

* * * * *